May 21, 1929.  M. W. HALL  1,714,364
INTERNAL COMBUSTION MOTOR
Filed May 6, 1927   2 Sheets-Sheet 2
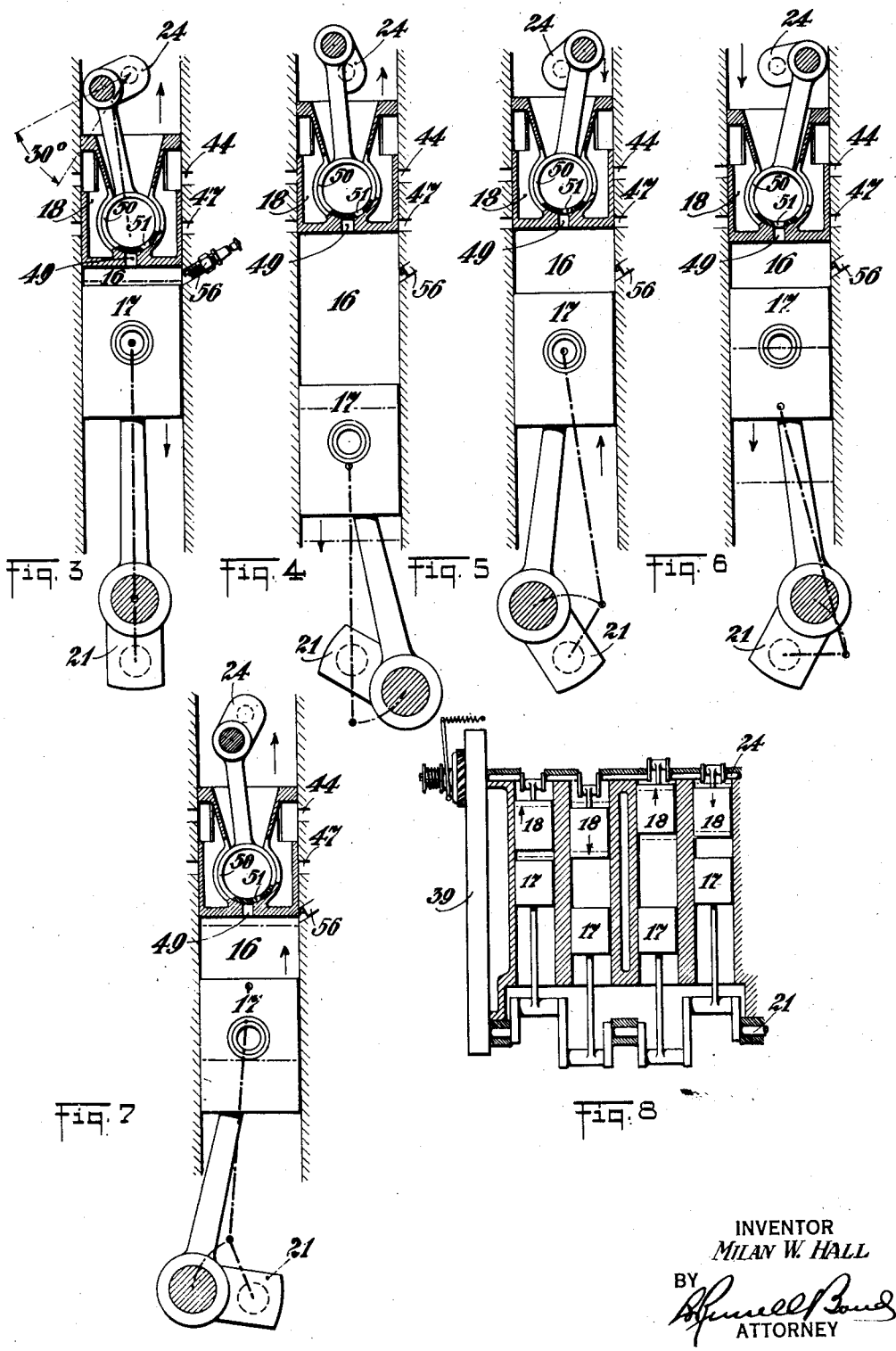
INVENTOR
MILAN W. HALL
BY
ATTORNEY Patented May 21, 1929.

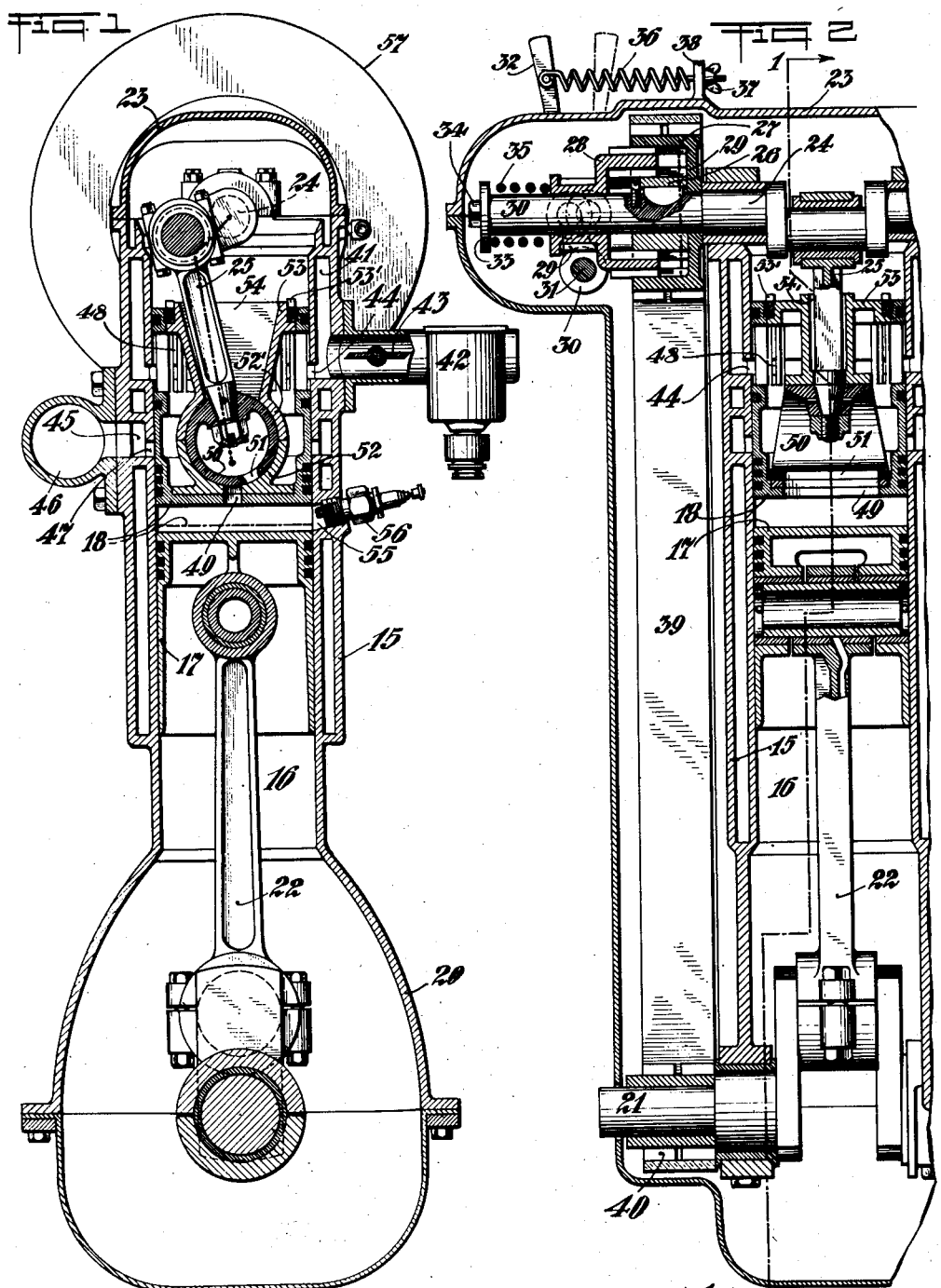

1,714,364

UNITED STATES PATENT OFFICE.

MILAN W. HALL, OF NEW ROCHELLE, NEW YORK; MINETTA HALL, ADMINISTRATRIX OF MILAN W. HALL, DECEASED, ASSIGNOR TO EDWIN B. LAPHAM, OF HOBOKEN, NEW JERSEY.

INTERNAL-COMBUSTION MOTOR.

Application filed May 6, 1927. Serial No. 189,342.

My invention relates to internal combustion motors and has for an object to improve the thermal function of compression in such motors, particularly when operating at reduced loads.

In pre-mixture type internal combustion motors, such as are in general use today the compression stroke of the piston and the combustion space in the cylinder are fixed, and the motor is controlled solely by a throttle which attenuates the fuel charge for lighter loads. This fixed ratio of compression stroke to combustion space is limited by the fact that when the throttle is wide open the fuel must not be compressed above the critical pressure at which spontaneous combustion takes place, with the result that when the motor is throttled down for light loads there is insufficient compression of the fuel charge.

In my co-pending patent application Serial No. 159,840, filed January 8, 1927, I disclosed means for varying the fuel charge volume without attenuation at the beginning of the compression period and simultaneously varying the combustion space volume in accordance with volumetric variations of the charge, whereby compression is maintained at constant or uniform pressure under all variations of load. In said co-pending application I disclosed a motor provided with opposed pistons, one of the pistons operating upon the four stroke cycle and the other upon the two stroke cycle and both pistons operating in unison under the impulses of the same explosions. Instead of using a throttle to control the motor, mechanical means were provided for varying the timing of one piston with respect to the other opposed piston, whereby the volume of the fuel charge and the volume of the compression space were regulated to maintain a constant compression pressure under varying loads.

An object of the present invention is to provide an improvement on the invention disclosed in said co-pending application whereby the volume of the compression space and the volume of the fuel charge will be automatically regulated to maintain a constant compression pressure under varying loads.

Another object of my invention is to provide a throttle controlled motor of double opposed piston type in which the parts are so related that the timing of one piston with respect to the other automatically adjusts itself to the richness of the fuel mixture as controlled by the throttle.

Another object of my invention is to provide a motor of the character above described in which the relative timing of the opposed pistons may be controlled either automatically or by direct manual means.

With these and other objects in view my invention consists in certain novel features of construction and combinations and arrangements of parts which will be more fully hereinafter described and pointed out in the claims.

A preferred embodiment of my invention is illustrated in the accompanying drawings in which, Figure 1 is a view of my improved motor in transverse vertical section taken on the line 1—1 of Fig. 2;

Fig. 2 is a side view of a portion of the motor shown largely in section;

Figs. 3 to 7 inclusive are schematic views showing successive positions of the opposed pistons of my improved motor; and Fig. 8 is a somewhat schematic view of a four cylinder motor embodying my invention and showing by dotted lines the relative positions of the pistons in the different cylinders when the throttle is at idling position and by full lines when the throttle is wide open.

In the drawings I have used the reference numeral 15 to indicate the cylinder block of my engine. The block may be formed with a plurality of cylinders 16, only one of which is shown in Figs. 1 and 2. Pistons 17 are fitted to reciprocate in the lower portion of the cylinders and pistons 18 are fitted to reciprocate in the upper portion of the cylinders. The lower part of the cylinder block is formed with the usual crank case 20 in which is mounted a crank shaft 21 connected to the pistons 17 by means of connecting rods 22. At the upper end of the cylinder block there is another crank case 23 in which is mounted a crank shaft 24, the latter being connected by connecting rods 25 to the pistons 18.

The pistons 17 are adapted to operate on four stroke cycle and the pistons 18 on two stroke cycle and hence the crank shafts 21 and 24 are connected by gearing of such ratio that the latter crank shaft shall run at half the speed of the former crank shaft. This gearing includes means for varying the relative angular position of the crank shaft 24 with respect to the crank shaft 21. To this end a spiral-toothed wheel 26 is keyed to one end of the crank shaft 24. Mounted to rotate freely on the latter crank shaft is another wheel 27 which is formed with a laterally extending rim peripherally surrounding, but spaced from the wheel 26. The inner periphery of the rim 27 is formed with spiral teeth whose pitch or angle is reversed with respect to the spiral teeth on the wheel 26. Mounted to slide on the shaft 24 is a sleeve 28 which has an extension adapted to fit between the wheels 26 and 27. This sleeve is formed, on the inner periphery of the extension, with teeth adapted to engage the teeth of wheel 26 and on the outer periphery with teeth adapted to engage the teeth of wheel 27. The angle of the teeth on wheels 26 and 27 and sleeve 28 is such as to produce an end thrust tending normally to force the sleeve outward along the shaft 24 or toward the left as viewed in Fig. 2. The sleeve 28 carries a collar 29 which is connected by means of a yoke 30 to a control shaft 31. The latter projects through the outer wall of the cylinder block and carries a control lever 32. The outer end of the shaft 24 is provided with an abutment preferably in the form of a washer 33 secured to the shaft by means of a bolt 34. Between the washer 33 and the adjacent end of the collar 29 is fitted a compression spring 35 which tends normally to press the sleeve inward against the thrust of the spiral teeth on said sleeve and the wheels 26 and 27. I also provide a tension spring 36 connected at one end to the control lever 32 and secured at the other end by a thumb nut 37 threaded thereon and bearing against a lug 38 formed on the crank case 23. Both of these springs cooperate normally to maintain the sleeve 28 in its innermost position, but will yield under certain conditions, presently to be described, to permit the sleeve to move outward along the shaft 24. One of the two springs may be dispensed with, if so desired, provided the other is made heavy enough or strong enough to give the desired result. The wheel 27, on its outer periphery, is formed with sprocket teeth to engage a chain belt 39 which passes about a sprocket wheel 40 secured to the shaft 31. The diameter of the sprocket wheel 40 is one half the diameter of the sprocket wheel 27 so that the crank shaft 21 is geared to make two rotations for each rotation of the crank shaft 24, and hence the pistons 17 make two complete reciprocations for each reciprocation of the pistons 18. However, the timing or angular relation of one piston of an opposed pair with respect to the other may be varied, either by manually operating the handle 32 to slide the sleeve 28 along the shaft 24, or automatically under control of the springs 35 and 36, as will be described hereinafter.

The cylinder block is provided with an intake manifold 41 connected with a suitable carbureter 42. In the manifold, between the carbureter and the cylinder block, there is a throttle valve 43 which may be connected by suitable means to an operating lever (not shown). Ports 44 lead from the intake manifold into the cylinder 16 at a point where they may be controlled by the upper piston 18. At a point lower down on the cylinder block there is an exhaust manifold 45 connected with an exhaust pipe 46, and ports 47 in the cylinder wall connect the cylinder with the exhaust pipe. Both the exhaust ports 47 and the intake ports 44 are adapted to be controlled by the piston 18.

The construction of the piston 18 is clearly shown in Figs. 1 and 2. It will be observed that the intake mixture is fed into the interior of the piston 18 through ports 48, and is delivered to the cylinder between the pistons 17 and 18 through a port 49 formed in the bottom of the latter piston. The port 49 is in the form of an elongated slot and is controlled by a hollow piston pin 50 which connects the rod 25 to the piston 18. The hollow piston pin 50 has a port 51 therein, adapted in certain positions of the pin to register with the port 49. The piston pin thus serves as a valve and is arranged to oscillate in a bearing carried by the piston 18. The bearing is preferably formed of a lower semi-cylindrical section 52 secured to the bottom wall of the piston 18 and provided with a port therein which registers with the port 49, and an upper semi-cylindrical section 52' provided with an extension 53 secured to the top of the piston by suitable means such as a threaded ring 53'. The extension 53 has a slot 54 therein, through which passes the connecting rod 25, the slot being flared toward the top to provide freedom for angular movement of the connecting rod.

Figs. 1 and 2 show the position of the pistons, at the point of maximum compression when under full load conditions, with a maximum combustion space between the two pistons. A port 55 is formed in each cylinder to receive the spark plug 56 by which the charge may be fired.

It will be understood that the volume of the combustion space between pistons 17 and 18 will depend upon the relative angular position of the two crank shafts 21 and 24. Owing to the angle of the spiral teeth of the sleeve 28, when the latter sleeve is moved inward to the full limit, the crank shaft 24 will be angularly displaced in counter-clockwise direction, as viewed in Fig. 1, to the position shown by dotted lines, and the upper piston 18 will accordingly be depressed to the position shown by broken lines, thus reducing to a very small space, the combustion space into which the fuel must be compressed. The broken line thus indicates the relative positions of the pistons when the motor is operating at idling speed, or no load.

The operation of the motor is similar to that shown in my co-pending application and may be followed by referring to the schematic views Figs. 3 to 7 inclusive, in which the relative positions of the pistons when the motor is operating with the throttle wide open is shown by full lines, while the positions of the pistons when the throttle is set for idling speed, are indicated by dotted lines. Fig. 3 shows the positions of the pistons at the point of maximum compression. When the charge is fired the piston 17 is driven downward and the piston 18 is driven upward, and the power of the two pistons is combined by reason of the chain belt 39 connecting the two crank shafts 21 and 24. Fig. 4 shows the position of the parts at the moment when exhaust begins. The piston 18 has risen sufficiently to begin to uncover the ports 47 which remain open until the piston 17 has completed its downward stroke and returns to the position shown in Fig. 5. In this position the piston 18 is moving downward and has just cut off the exhaust ports 47. The port 51 in the piston pin 50 has established communication with the port 49, but communication with the inlet port 44 is closed by the piston 18. Fig. 6 illustrates the position of the parts at the beginning of the intake. The piston 18 is beginning to uncover the intake ports 44 and fuel is beginning to be drawn through the hollow piston pin 50 and into the cylinder between the pistons 17 and 18. The intake ports will remain open while the piston 17 is descending and also while the piston 17 is rising to the position shown in Fig. 7, so that some of the charge which was drawn into the cylinder will be forced back through the hollow piston pin and into the intake manifold and only sufficient fuel mixture will be retained to provide the proper compression ratio. Fig. 7 shows the parts just as the intake is cut off by oscillation of the hollow piston pin 50. The cycle is then completed by a movement of the pistons to the position shown in Fig. 4. It will be observed that when idling, most of the fuel taken in by the downward stroke of the piston 17 will be rejected and forced back into the intake manifold but that this smaller charge will be compressed into a smaller combustion space because of the closer approach of the pistons 17 and 18 at the point of maximum compression shown in Fig. 3. Thus the compression of the fuel is maintained at a practically constant value regardless of the attenuation of the charge.

As so far described, the operation of my improved motor is closely similar to the operation of the motor described in said copending application. There is this important difference, however, namely that the angular relation of upper and lower crank shafts was maintained at a fixed adjustment in the construction previously disclosed and no throttle was employed, while in the present construction a throttle is used and the angular relation of the upper and lower crank shafts is flexible. Whenever a charge is fired the relative pressure between the pistons 17 and 18 tends to advance the crank shaft 24 relative to the crank shaft 21, but this advance is resisted by the springs 35 and 36, and also by the friction of the intermeshing spiral teeth on members 26, 27 and 28. The strength of these springs should be such as to prevent any appreciable angular advance of crank shaft when the throttle is at idling position, but as the throttle is opened and a richer fuel mixture is admitted into the cylinders the pressure of combustion between the pistons will be increased and the springs will yield proportionately, permitting a proportionate advance of crankshaft 24 relative to crankshaft 20, until at wide open throttle the crankshaft 24 will advance to the position shown by full lines in Fig. 1. The strength of the spring pressure tending to resist advance of the crank shaft 24 may be adjusted by any suitable means, such, for instance, as the thumb nut 37 shown in Fig. 2. Thus the advance or retardation of the crankshaft 24 will automatically follow the position of the throttle 43.

However, there will be a tendency for the crank shaft when advanced, to return immediately under the impulse of the springs so that the relative timing of the two pistons would not be properly maintained during a complete cycle. In the case of a multiple cylinder motor each pair of pistons, as it passed through its own combustion period, would control the positions of the remaining pistons during that period. For instance, in Fig. 8, I show a four cylinder motor operating at wide open throttle and firing in the order indicated by the numbers 1, 2, 3, and 4. The crankshaft 24 has just been advanced by combustion in cylinder 4; combustion is about to take place in cylinder 1 in which a maximum combustion space is maintained by the relative advance of crankshaft 24, and the pistons in cylinder 2 are correspondingly timed to reject the requisite amount of fuel and close the intake at the proper point to retain the desired amount of fuel. In a motor of four or more cylinders successive power impulses take place at such frequent intervals that the springs have not time to retard the crankshaft between impulses, particularly in view of the frictional engagement between the intermeshing spiral teeth, and the crankshaft is maintained at a practically constant advance determined by the richness of the fuel mixture as controlled by the throttle. However, to avoid all possibility of angular pulsation or fluttering of the crankshaft 24 a flywheel 57 may be mounted on said crankshaft as shown in Fig. 1.

It will be understood that my invention is not confined to multiple cylinder motors, but is equally applicable to motors of one, two, or more cylinders. In the case of a single or a double cylinder motor it is necessary to mount a flywheel 57 on the crankshaft 24, or to provide some similar means for absorbing the pulsations produced by intermittent combustion and holding the crankshaft at a steady angle of advance determined by the position of the throttle.

Whenever desired, the throttle may be set at wide open position and the motor may then be controlled solely by operation of the lever 32 to maintain the desired angular relation of crank shaft 24 with respect to crank shaft 21.

Having thus described my invention and with the understanding that various changes, alterations and modifications may be made in the construction and arrangement of the motor without departing from the spirit and scope of my invention, I claim:

1. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, and resilient means controlled by the power developed in the combustion space for varying the relative timing of said pistons to vary the volume of said combustion space and the volume of fuel mixture retained in the cylinder.

2. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, resilient means controlled by the power developed in the combustion space for varying the relative timing of said pistons to vary the volume of said combustion space and the volume of fuel mixture retained in the cylinder, and means for varying the resiliency of said resilient means.

3. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, resilient means controlled by the power developed in the combustion space during one-cycle, to vary the volume of said combustion space during the next succeeding cycle.

4. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, and resilient means controlled by the power developed in the combustion space during one-cycle, to vary the volume of said combustion space and the volume of full mixture retained in the cylinder during the next succeeding cycle.

5. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, resilient means controlled by the power developed in the combustion space during one-cycle, to vary the volume of said combustion space and the volume of full mixture retained in the cylinder during the next succeeding cycle, and means for varying the power of said resilient means.

6. In an internal combustion motor, a cylinder, a pair of pistons reciprocable therein and cooperating to provide a common combustion space therebetween, one of said pistons being adapted to operate on four-stroke cycle and the other on two-stroke cycle, the cylinder being formed with intake and exhaust ports, one of said pistons serving to control the opening and closing of said ports, a throttle for varying the richness of fuel admitted into the combustion space through said intake port, resilient means controlled by the power developed in the combustion space during one cycle, to vary the volume of said combustion space and the volume of full mixture retained in the cylinder during the next succeeding cycle, and inertia means tending to resist variation of the relative timing of said pistons.

7. In an internal combustion motor, a pair of crankshafts, a spiral-toothed wheel driven by one shaft, a second wheel concentric with the first wheel and driven by the other shaft, the second wheel being formed with internal spiral teeth reversely angled with respect to the teeth of the first wheel, a sleeve slidable between said wheels and formed with external and internal spiral teeth engaging the teeth of said wheels respectively, the angle of said teeth being such as to produce an end thrust on the sleeve, and a spring adapted to resist said end thrust.

8. In an internal combustion motor, a cylinder, a pair of pistons reciprocable therein and cooperating to provide a common combustion space therebetween, the cylinder being formed with ports for the intake of fuel and the exhaust of products of combustion, one of said pistons serving to control the opening and closing of said ports, and resilient means controlled by the power developed in the combustion space for varying the relative timing of said pistons to vary the volume of said combustion space and the volume of fuel mixture retained in the cylinder.

9. In an internal combustion motor, a cylinder, a pair of pistons reciprocable therein and cooperating to provide a common combustion space therebetween, a cylinder being formed with ports for the intake of fuel and the exhaust of products of combustion, one of said pistons serving to control the opening and closing of said ports, resilient means controlled by the power developed in the combustion space for varying the relative timing of said pistons to vary the volume of said combustion space and the volume of fuel mixture retained in the cylinder, and means for varying the resiliency of said resilient means.

Signed at New York, in the county of New York and State of New York, this 28th day of April A. D. 1927.

MILAN W. HALL.